(12) United States Patent
Zsigmond et al.

(10) Patent No.: US 8,625,995 B2
(45) Date of Patent: Jan. 7, 2014

(54) SIGNAL POWER BASED ROUTING IN WDM ALL-OPTICAL NETWORKS

(75) Inventors: Szilard Zsigmond, Budapest (HU); Marcell Perényi, Budapest (HU); Tibor Cinkler, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 331 days.

(21) Appl. No.: 12/995,036

(22) PCT Filed: May 29, 2008

(86) PCT No.: PCT/EP2008/056579
§ 371 (c)(1),
(2), (4) Date: Jan. 4, 2011

(87) PCT Pub. No.: WO2009/143888
PCT Pub. Date: Dec. 3, 2009

(65) Prior Publication Data
US 2011/0116797 A1    May 19, 2011

(51) Int. Cl.
*H04B 14/00* (2006.01)
(52) U.S. Cl.
USPC ................... 398/91; 398/66; 398/57

(58) Field of Classification Search
USPC .......................................... 398/57
See application file for complete search history.

(56) References Cited

U.S. PATENT DOCUMENTS

| | | | |
|---|---|---|---|
| 2003/0016414 A1* | 1/2003 | Solheim et al. | 359/127 |
| 2005/0100345 A1* | 5/2005 | Welch et al. | 398/183 |
| 2007/0201871 A1* | 8/2007 | Peddanarappagari et al. | 398/57 |

OTHER PUBLICATIONS

Hamad A M et al: "Optimal power-aware design of all-optical multicasting in wavelength routed networks" Communications, 2004 IEEE International Conference on Paris, France Jun. 20-24, 2004, Piscataway, NJ, USA, IEEE vol. 3. Jun. 20, 2004, pp. 1796-1800.

* cited by examiner

*Primary Examiner* — Danny Leung

(57) ABSTRACT

In a Wavelength Division Multiplexed (WDM) all-optical network having optical nodes linked together by optical fibers carrying communication channels of separate wave-lengths, a method is applied in order to extend the size of the all-optical network. According to the method, a model is set up for the all-optical network in which a wavelength graph containing vertices and edges represents the physical effects of the nodes and links. After identifying a set of demand, an objective function is calculated expressing the total routing cost and total signal power demand of the channels. The minimum of the objective function returns the signal powers for each channel to be tuned.

6 Claims, 5 Drawing Sheets

SIGNAL POWER BASED ROUTING IN WDM ALL-OPTICAL NETWORKS

TECHNICAL FIELD

The present invention relates to optical networks. In particular, the present invention is directed to a method and a node for defining signal power in a Wavelength Division Multiplexed (WDM) all-optical network.

BACKGROUND

In fiber-optic communications, WDM is a technology which multiplexes multiple optical carrier signals on a single optical fiber by using different wavelengths (colours) of laser light to carry different signals. This allows for a multiplication in capacity, in addition to enabling bidirectional communications over one strand of fiber. A WDM system uses a multiplexer at the transmitter to join the signals together and a de-multiplexer at the receiver to split them apart. With the right type of fiber it is possible to have a device that does both simultaneously, and can function as a so called optical add-drop multiplexer (OADM). Older, or fixed, OADMs cannot configure capacity at a node. The technology called Reconfigurable Optical Add/Drop Multiplexer (ROADM) represents a real breakthrough for WDM networks providing the flexibility and functionality required in today's complex networking environment. In contrast to OADMs, ROADMs allow service providers to reconfigure add and drop capacity at a node remotely, e.g. to define channels branching-off, reducing operating expenses by eliminating the time and complexity involved in manual reconfiguration. Furthermore, ROADMs allow the service provider to design an optical network once, and then never to have to worry about it again, regardless of how the network grows. The design phase in a ring topology ensures that any node can communicate with any other node using any wavelength. ROADM functionality is part of the solution for a deployable system, but in order to exploit the benefits of ROADM in metro WDM networks increased data management capabilities on individual wavelengths are also needed. (Metro network is WDM network with a range of 40-500 kms). For instance, ROADM rings are very sensitive to topology changes, and need close monitoring and control of wavelength power to keep the system in balance. The real innovation lies in the system engineering related to the ROADM function, addressing per-wavelength power measurement and management, and per-wavelength fault isolation. Almost every optical system vendor has ROADM with wavelength monitoring functions in commerce.

The next step for fully reconfigurable WDM optical networks are the tunable Small Form-factor Pluggable (SFP), where the wavelength allocation is changed as the needs of the network change. The other innovations are the tunable dispersion compensation elements. These network elements are ready-made products and can be purchased nowadays. The evolution of the optical networks seems to tend towards a fully reconfigurable network where the control and management plane will have new functions such as determining the signal quality, tuning the wavelength frequency, setting dispersion compensation units and by using Variable Optical Attenuators (VOA) setting the channel powers. Of course the traditional functions such as routing will remain its main function.

In an all-optical network the problem of routing and wavelength assignment (RWA) is critically important for increasing the efficiency of wavelength-routed. Given the physical network structure and the required connections, the RWA problem is to select a suitable path and wavelength among the many possible choices for each connection so that no two paths sharing a link are assigned to the same wavelength.

Solutions are known for this type of technology like a non-disruptive lightpath routing described in patent application U.S. 2004/0109683 A1, that presents the possibility of modifying the routing lightpaths without interrupting service.

Another solution is described in patent publication WO 2006/000510 A1 relating to optical path feasibility in an optical communication network presenting a signal quality calculation method based on physical impairments.

In both publications mentioned above, the power of certain channels within a fiber is set uniformly to equal levels. This is one of the remaining effects of the point-point optical networks. Of course there is technical simplification using this kind of channel power allocation: Using the same channel powers the nonlinear effects will have the smallest impact onto the signal quality.

This allocation schemes leads to the problem that in many cases where a channel is dedicated to a connection for a short distance due to the same channel powers the signal quality will be unnecessarily good i.e. the channel is over engineered Additionally, in patent specification U.S. Pat. No. 7,068,932 a method and system for automatic initialization of an optical network are provided. A network management system (NMS) performs remote determination of span losses and sets the operating points of network components. The initialization method comprises remotely and automatically setting target gains of optical amplifiers and signal power levels at transmitters and receivers to required operating values. The methods for initialization of the optical network of the embodiments include gain excursion minimization (GEM) for individual channels passing through amplifiers and/or pre-emphasis of the optical link, where channel powers at the transmitters are biased to compensate for the effects of optical amplifiers gain ripple. U.S. Pat. No. 7,068,932 does not describe a network-wide optimum taking into account of constrains of links and nodes in the network.

As the size of the network that can be reached all-optically is a function of the signal power, it would be possible to use higher signal powers that would increase the size of the all optical networks, i.e. would decrease the numbers of optical-electrical-optical conversions without increased physical impairments.

It is therefore seen to be desirable to construct a method for an all-optical network where it is allowed to tune the signal power of individual channels in order to achieve an increased size of the whole network in which the quality of signals remains within an acceptable level.

SUMMARY

The present invention involves a method, node and an all-optical network, which solve the aforementioned problem that will become apparent from an understanding of the following description.

According to the invention, the objective set was achieved by a method applied to a WDM all-optical network in which optical nodes are linked together by optical fibers carrying communication channels of separate wavelengths. In the first step a model is set up for the all-optical network. In the model a wavelength graph contains vertices and edges, a part of which represents switching function inside a node while other edges represent wavelengths of a physical link. Then an objective function is calculated expressing the total routing cost and total signal power demand of the channels. Looking for the minimum of the objective function, the signal powers for each channel are determined and tuned.

In a possible embodiment, the objective function may be defined to return physical effects of both optical fibers and nodes as the function between maximum allowable distance and the signal power. The physical effect of a node may be defined to be equal to a certain length of an optical fiber, e.g. 90 kms.

The objective function may be defined to use constants as input parameters, e.g. an upper limit of the total signal power in physical links, or linear relation between the input power of a demand and the maximum distance the signal is allowed to reach, or a parameter expressing the tradeoff between minimal total routing cost and minimal total signal power of the channels, or a constant for expressing a maximum allowable signal power for one channel.

In another aspect, the present invention is directed to a node for signal power based routing in a WDM all-optical network. The node comprises VOAs which are adapted to tune individual signal powers of channels so that total routing cost and total signal power of the channels are minimized. The node may be an OXC or a ROADM.

In yet another aspect, the present invention is directed to an all-optical network in which optical nodes are linked together by optical fibers carrying communication channels. At least a part of the optical nodes are adapted to tune signal power individually so that total routing cost and total signal power of the channels are minimized.

The method of the invention may also be embodied in a computer program product and a memory coupled to the processor, wherein the memory is encoded with one or more programs that may perform the method based on the model.

The most important advantage of the invention is a global optimum that provides a larger all-optical network with the same quality requirements of the traditional RWA routing allocation scheme.

It is also advantageous that increasing the number of wavelengths the performance will improve.

Another advantage is that it works reasonable faster, and it can also be considered as an Impairment Constraint Based Routing (ICBR) technology where the physical effects are taken into account while routing decisions are taken.

BRIEF DESCRIPTION OF THE DRAWINGS

In the following, the essential features of the invention will be described in detail by an example for an embodiment illustrated by the figures of the attached drawing. In the drawing.

DETAILED DESCRIPTION

FIGS. 1A, 1B, 1C and 1D illustrate how the proposed algorithm gives obviously better results than the traditional RWA algorithms in an all-optical network. This is due to the additional degree of freedom namely, the possibility to tune the signal powers. For simplicity, let us consider a network with all-optical nodes "A", "B", "C", "D", "E" carrying two channels with wavelengths $\lambda_1$, $\lambda_2$. Assume, that in FIG. 1A the node "A" can only reach node "C" (solid lines) in the traditional routing schemes. Consider two demands between node "A" and "B", and node "A" and "D". In case of traditional routing schemes the demand between nodes "A" and "D" can not be established due to physical layer constraints, e.g. due to amplified spontaneous noise (dotted lines between node "C" and "D"). The demand between node "A" and "B" can be established but the signal quality would be unnecessary good, i.e. the connection is over-engineered. Using the proposed routing schemes according to FIG. 1B, we can increase the signal power of channel $\lambda_2$ and in this way it is possible to establish a connection between node "A" and "D" (solid line with wavelength $\lambda_2$). Of course while increasing the signal power of channel $\lambda_2$ the signal power of channel $\lambda_1$ must be decreased, but this signal power is still enough to establish the connection between node "A" and "B".

Figure 1A:
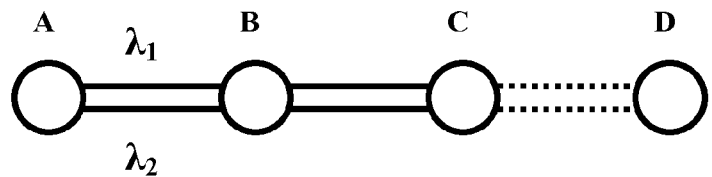
FIGS. 1A, 1B, 1C and 1D are illustrations for the basic concept of the invention in an all-optical network.
Figure 1B:
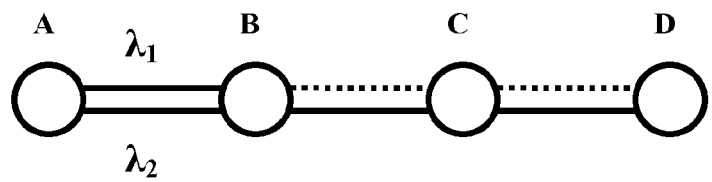
Figure 1C:
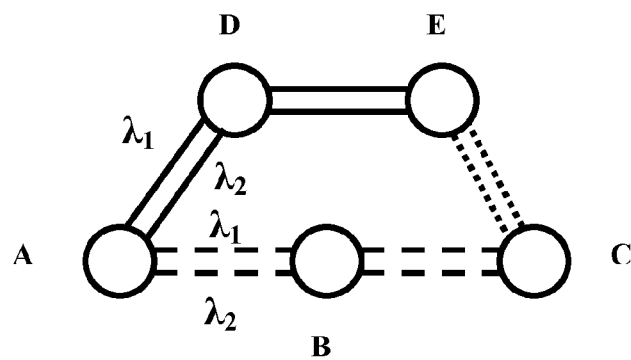
Figure 1D:
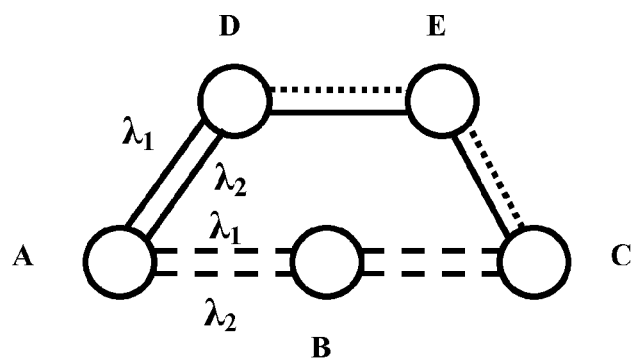

In FIGS. 1C and 1D a typical routing problem is depicted. We would like to establish a connection between node "A" and "C" (dashed lines). Consider that in the route "A"-"B"-"C" all the wavelengths are in use for other demands. The only solution remains using longer routes like "A"-"D"-"E"-"C". Due to physical constraints this connection cannot be done (dotted lines). However, using the proposed routing schemes in FIG. 1D, we can establish this connection (solid line with wavelength $\lambda_2$) by increasing the signal power of $\lambda_2$ between nodes "A"-"D"-"E"-"C" and decreasing the signal power of $\lambda_1$ between nodes "A"-"D"-"E"-"C" at the same time.

Figure 2:
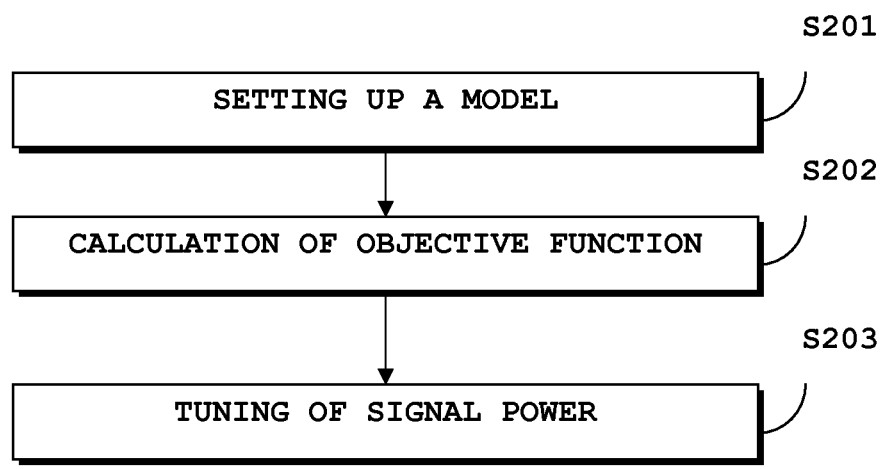
FIG. 2 is a flowchart for illustrating method steps.

In FIG. 2, method steps of the invention are illustrated. In the first step S201 a model is set up in which a wavelength graph contains vertices and edges representing switching function inside a physical node and other edges represent wavelengths of a physical link. (The model will be described in detail in FIG. 3).

In the second step S202 a calculation is carried out to set up an objective function expressing the total routing cost and total signal power demand of the channels. The following Integer Linear Programming (ILP) formulation to route the demands was used.

Constants:

$$P_{pl}^{max} = 4\text{--}20 \text{ dBm typically } 14 \text{ dBm} \tag{1}$$

Constant $P_{pl}^{max}$ means the upper limit of the total power in physical link pl expressed in dBm.

$$len_{ij} \tag{2}$$

Constant $len_{ij}$ is the length of the physical link used by the considered $\lambda$ channel.

$$len_{PhyNode} = 90 \text{ km typically} \tag{3}$$

Constant $len_{PhyNode}$ corresponds to the length of a fiber that has the same impairments as the switching device induces along the path of the demand.

$$L_c = 1200 \tag{4}$$

Constant $L_c$ is the factor of the linear relation between the input power of a demand (in mW) and the maximum distance the signal is allowed to reach.

$$\alpha = 0{,}5 \tag{5}$$

Constant $\alpha$ expresses the tradeoff between optimization objectives: minimal routing cost or minimal power.

$$s^o, t^o \tag{6}$$

Symbols $s^o$ and $t^o$ represent source and target of demand o.

$$\beta = \frac{n}{W} \cdot P_{pl\ lin}^{max} \tag{7}$$

Constant $\beta$ express the maximum allowable signal power for one channel in mW. Where n is between 1 and W, and W is the number of wavelengths in a fiber. For example in case n=2 the maximum allowed channel power would be the double of the cannel power obtained from the traditional allocation schemes.

$$P_{pl\ lin}^{max} \quad (8)$$

Constant $P_{pl\ lin}^{max}$ means the upper limit of total power in physical link pl in mW.

Variables:

$$p^o \in \left[0, \frac{\beta}{P_{pl\ lin}^{max}}\right], \forall o \in O \quad (9)$$

Variable $p^o$ denotes the input power of demand o divided by $P_{pl\ lin}^{max}$.

$$p_{ij}^o \in \left[0, \frac{\beta}{P_{pl\ lin}^{max}}\right], \forall (i,j) \in A, \forall o \in O \quad (10)$$

Variable $p_{ij}^o$ means the power of demand o on edge (i, j) divided by $P_{pl\ lin}^{max}$.

$$y_{ij}^o \in \{0,1\}, \forall (i,j) \in A, \forall o \in O \quad (11)$$

Variable $y_{ij}^o$ indicates whether demand o uses edge (i, j) or not.

Constraints:

$$\sum_{\forall o \in O} \sum_{\forall (i,j) \in pl} p_{ij}^o \leq 1, \forall pl \in PhyLinks \quad (12)$$

$$p_{ij}^o \leq y_{ij}^o, \forall (i, j) \in A, \forall o \in O \quad (13)$$

$$\sum_{\forall j \in V \to i} p_{ji}^o - \sum_{\forall k \in V \to i} p_{ik}^o = \begin{cases} -p^o & \text{if } i = s^o \\ 0 & \text{if } i \notin \{s^o, t^o\}, \forall i \in V, o \in O \\ +p^o & \text{if } i = t^o \end{cases} \quad (14)$$

$$\sum_{\forall j \in V \to i} y_{ji}^o - \sum_{\forall k \in V \to i} y_{ik}^o = \begin{cases} -1 & \text{if } i = s^o \\ 0 & \text{if } i \notin \{s^o, t^o\}, \forall i \in V, o \in O \\ +1 & \text{if } i = t^o \end{cases} \quad (15)$$

$$\sum_{\forall o \in O} y_{ij}^o \leq 1, \forall (i, j) \in A \quad (16)$$

$$\sum_{\forall (i,j)^{sw}} y_{ij}^o \cdot len_{PhyNode} + \sum_{\forall (i,j)^{pl}} y_{ij}^o \cdot len_{ij} \leq L(p^o) = L_c \cdot p^o \cdot P_{pl\ lin}^{max}, \quad (17)$$

$$\forall o \in O$$

Objective function:
Minimize $$\alpha \cdot \left[\sum_{\forall o \in O} \sum_{(i,j) \in A/A_{sw}} y_{ij}^o\right] + (1-\alpha) \cdot \left[\sum_{\forall o \in O} p_o\right]$$

Constraint (12) explains that the sum power of demands traversing a physical link (fiber) cannot exceed the maximum allowed power of that link.

Constraint (13) indicates that if the power of demand o in edge (i,j) is larger then zero, then edge (i,j) is used by demand o.

Constraints (14) and (15) express the flow-conservation constraint of the power and of the y decision variables, respectively, for every demand.

Constraint (16) indicates that a given edge can be used by only one demand.

Constraint (17) indicates that the total length of demand o should be less than the distance allowed by the input power of demand o.

The objective function expresses that the sum of the used edges should be minimized together with the sum of input powers of demands. If we want to minimize the total cost of routing, constant cost factors should be assigned to each edge. Constant α decides whether optimization emphasis is on minimal routing cost (α is close to 1) or on minimal input power (α is close to zero).

In the third step S203, the signal power of each channel is individually tuned so that the objective function is minimized.

Figure 3:
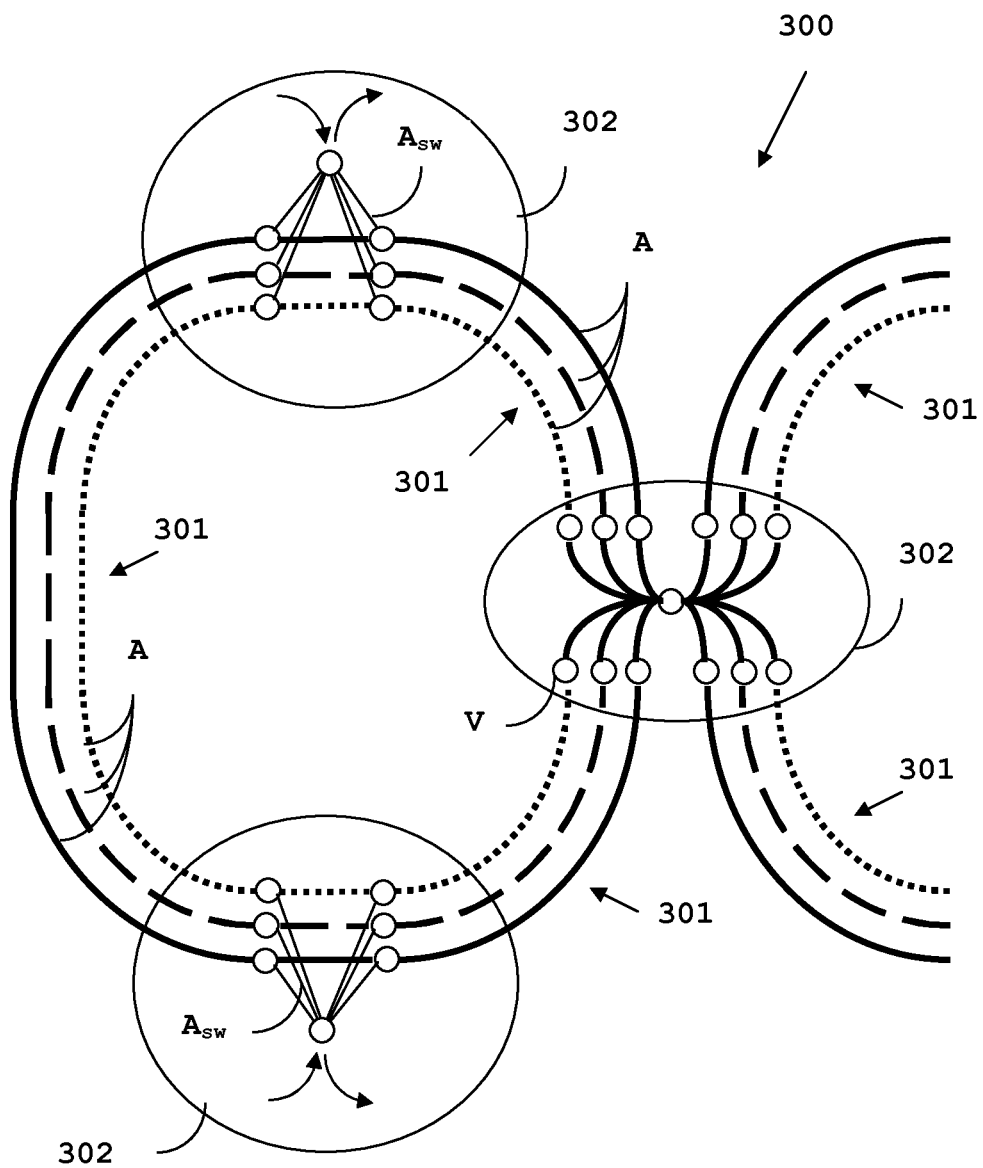
FIG. 3 schematically illustrates a model for the method.

In FIG. 3, a part of the model of the network consisting of physical links 301 and physical devices (nodes) 302 is represented by a wavelength graph 300. The wavelength graph 300 contains vertices V (only one is indicated) and edges A depicted by solid, dashed and dotted lines for each wavelength. (Three wavelengths are shown in this example). Symbol $A_{sw}$ (only one is indicated) denotes the set of edges representing switching function inside the node 302; other edges A represent wavelengths of a physical link 301. Arrows in some nodes 302 represent branch-off for certain channels. As it is clearly seen, the effect of physical nodes 302 and links 301 is represented by edges A, $A_{sw}$ and vertices V in the model.

Figure 4:
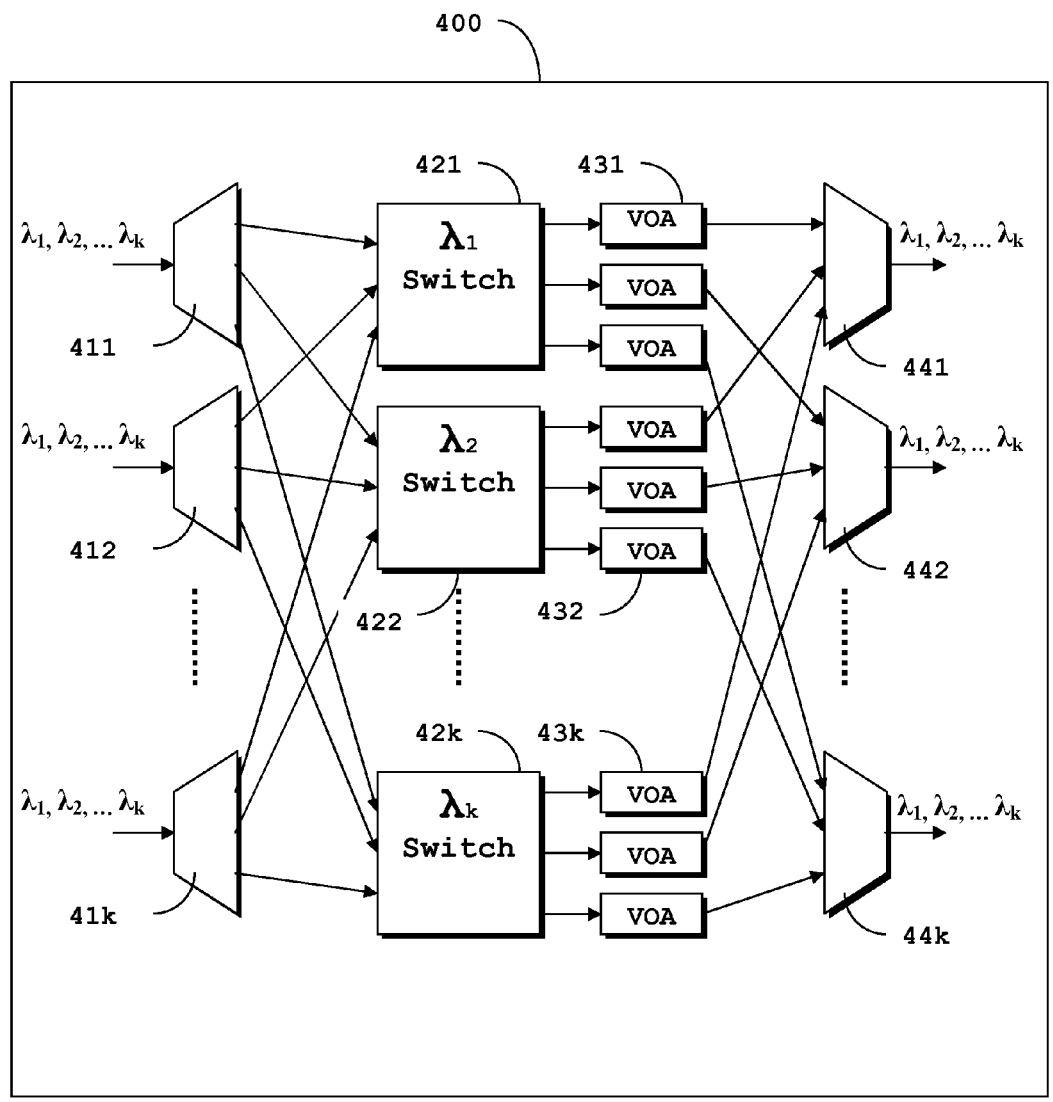
FIG. 4 is a block diagram illustrating an OXC.

FIG. 4 illustrates an OXC as a possible embodiment of an optical node 400 comprising de-multiplexers 411, 412, ..., 41k wavelength switches 421, 422, ..., 42k, Variable Optical Attenuators 431, 432, ..., 43k and multiplexers 441, 442, ..., 44k. The input of the de-multiplexers 411, 412, ..., 41k are optical fibers carrying channels of wavelengths $\lambda_1, \lambda_2, \ldots \lambda_k$. The output of the de-multiplexers 411, 412, ..., 41k are connected to the wavelength switches 421, 422, ..., 42k the outputs of which are linked to the Variable Optical Attenuators 431, 432, ..., 43k. The Variable Optical Attenuators 431, 432, ..., 43k are adapted to tune individual signal powers to meet minimal total routing cost and minimal total signal power of the channels according to the method described in FIG. 2. The tuned channels are multiplexed in multiplexers 441, 442, ..., 44k for the output of the node 400.

Figure 5:
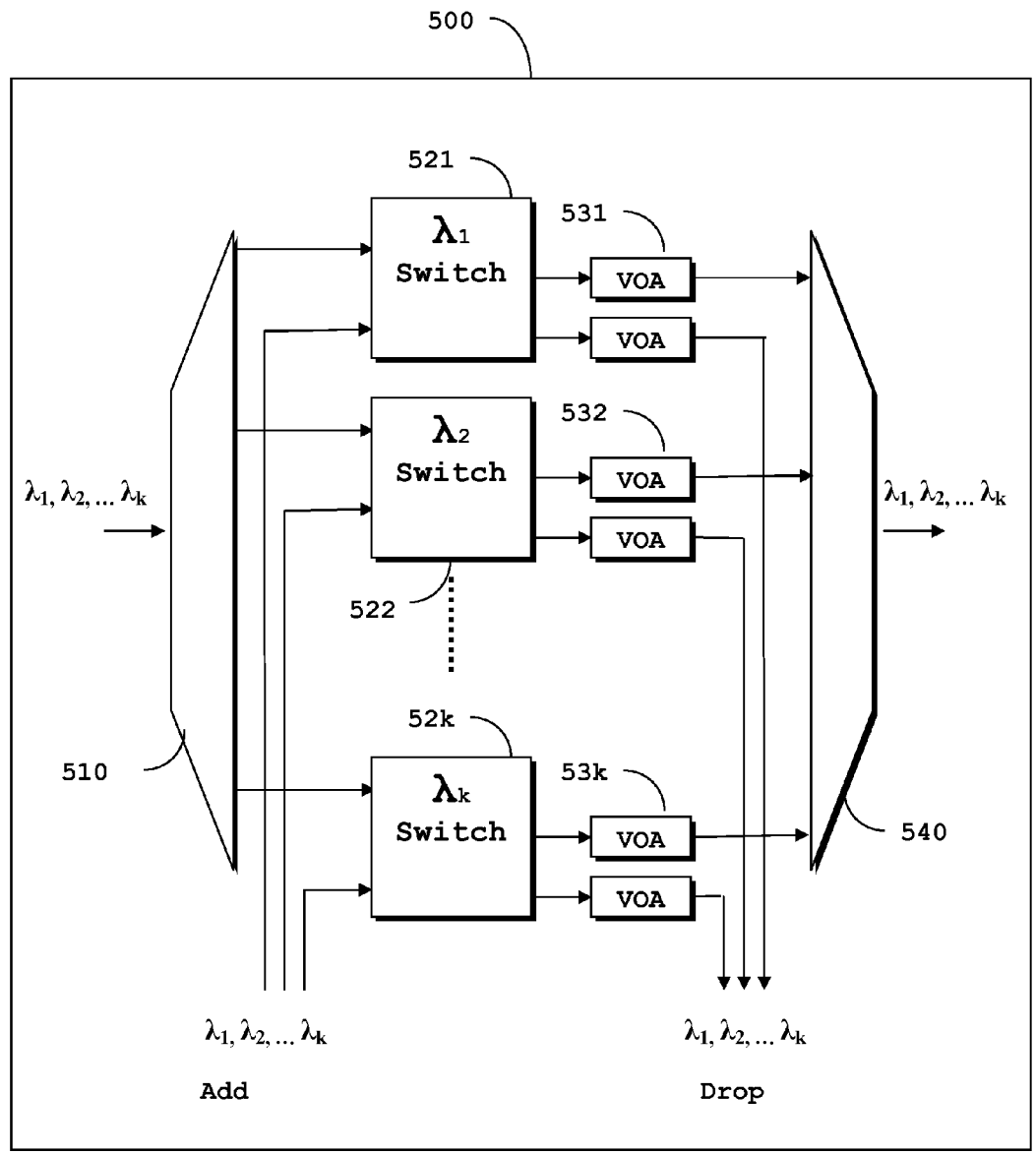
FIG. 5 is a block diagram of a ROADM.

FIG. 5 illustrates an ROADM representing another possible embodiment of an optical node 500 comprising a de-multiplexer 510, wavelength switches 521, 522, ..., 52k, Variable Optical Attenuators 531, 532, ..., 53k and a multiplexer 540. The input of the de-multiplexer 510 are optical fibers carrying channels of wavelengths $\lambda_1, \lambda_2, \ldots \lambda_k$. The outputs of the de-multiplexer 510 are connected to the wavelength switches 521, 522, ..., 52k the outputs of which are linked to the Variable Optical Attenuators 531, 532, ..., 53k. The Variable Optical Attenuators 531, 532, ..., 53k are adapted to tune individual signal powers to meet minimal total routing cost and minimal total signal power of the channels according to the method described in FIG. 2. A part of the tuned channels are multiplexed in the multiplexer 540 for the output of the node 500. There are added and dropped channels branching-off from the node 500. The added channels are connected to the inputs of the wavelength switches 521, 522, ..., 52k, while the other part of the tuned channels constitutes the dropped channels.

Those skilled in the art will appreciate that the method and model explained above may be implemented using software functioning in conjunction with a programmed microprocessor or a general-purpose computer. It will also be appreciated that while the current invention is primarily described in the form of a method, the invention may also be embodied in a computer program product and a memory coupled to the processor, wherein the memory is encoded with one or more programs that may perform the method disclosed in connection with FIG. 2 and based on the model disclosed in connection with FIG. 3.

Although the preferred embodiments of the present invention have been illustrated for OXC and ROADM, it is understood that the invention is not limited to these embodiments disclosed, but is capable of other type of optical nodes as set forth and defined by the following claims.

The invention claimed is:

1. A method of signal power based routing in a Wavelength Division Multiplexed all-optical network in which optical nodes are linked together by optical fibers carrying communication channels of separate wavelengths ($\lambda_1, \lambda_2, \ldots \lambda_k$), comprising the steps of:

setting up a model for the all-optical network in which a wavelength graph contains vertices (V) and directed edges (A), a part of the edges ($A_{sw}$) represents switching function inside a node while another part of the edges ($A_{sw}$) represent wavelengths of a physical link, calculating an objective function expressing total routing cost and total signal power of the channels, the objective function being defined to use a constant ($\alpha$) for expressing a tradeoff between minimal total routing cost and minimal total signal power of the channels, and individually tuning a signal power of the channels with Variable Optical Attenuators so that the objective function is minimized.

2. The method of claim 1, in which the objective function is defined to return physical effects of both optical fibers and nodes as a function between maximum allowable distance and the signal power.

3. The method of claim 2, in which the physical effects of a node are defined to be equal to a certain length of an optical fiber.

4. The method of claim 1, in which the objective function is defined to use a constant ($P_{pl}^{max}$) for an upper limit of the total signal power in physical links as an input parameter.

5. The method of claim 1, in which the objective function is defined to use a constant ($L_c$) as an input parameter for linear relation between an input power of a demand and a maximum distance a signal is allowed to reach.

6. The method of claim 1, in which the objective function is defined to use a constant ($\beta$) for expressing a maximum allowable signal power for one channel.

* * * * *

UNITED STATES PATENT AND TRADEMARK OFFICE
CERTIFICATE OF CORRECTION

PATENT NO. : 8,625,995 B2  Page 1 of 1
APPLICATION NO. : 12/995036
DATED : January 7, 2014
INVENTOR(S) : Zsigmond et al.

It is certified that error appears in the above-identified patent and that said Letters Patent is hereby corrected as shown below:

In the Specification

In Column 5, Lines 55-56, delete " $\alpha \cdot \left[ \sum_{\forall o \in O} \sum_{(i,j) \in A/A_{sw}} y^o_{ij} \right] + (1-\alpha) \cdot \left[ \sum_{\forall o \in O} p_o \right]$ " and insert -- $\alpha \cdot \left[ \sum_{\forall o \in O} \sum_{\forall (i,j) \in A/A_{sw}} y^o_{ij} \right] + (1-\alpha) \cdot \left[ \sum_{\forall o \in O} p^o \right]$ --, therefor.

In Column 5, Line 63, delete "then" and insert -- than --, therefor.

Signed and Sealed this
Fifth Day of August, 2014

Michelle K. Lee
*Deputy Director of the United States Patent and Trademark Office*